Oct. 24, 1972 FUMIO NAITO ET AL 3,700,596
PIEZOELECTRIC CERAMIC COMPOSITIONS
Filed July 31, 1968
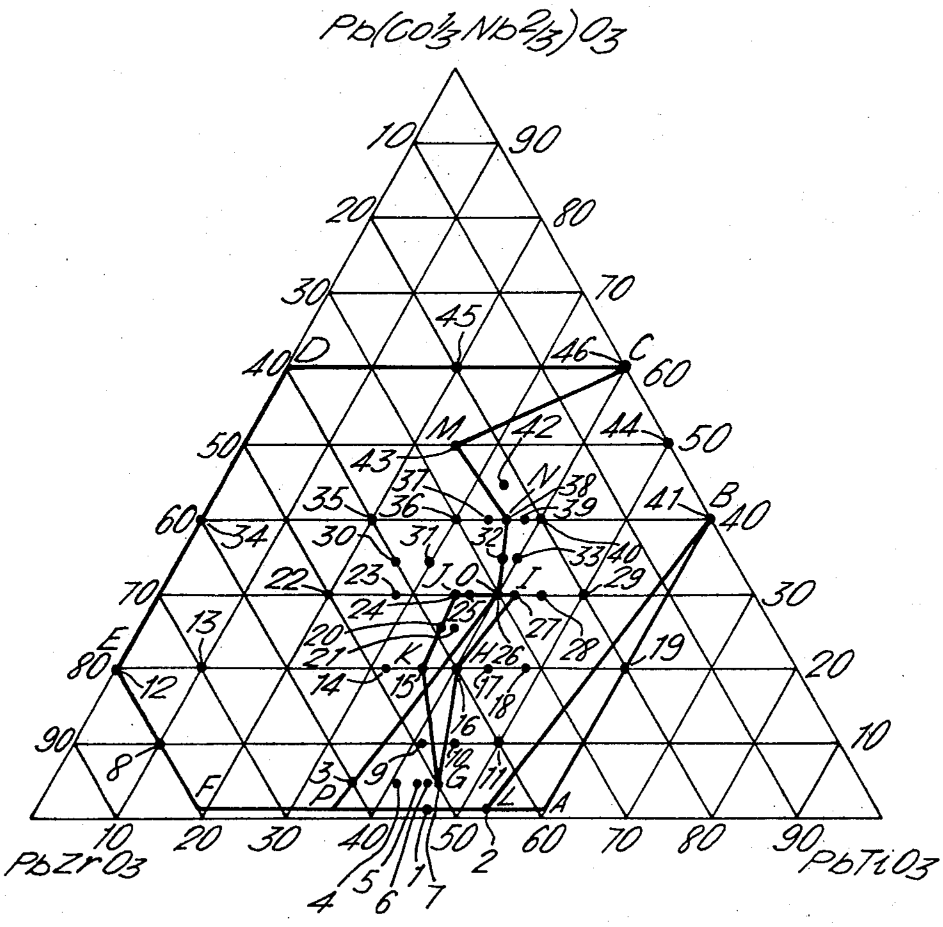

United States Patent Office 3,700,596
Patented Oct. 24, 1972

3,700,596
PIEZOELECTRIC CERAMIC COMPOSITIONS
Fumio Naito, Toshiyuki Kudo, and Masanobu Kubosaki, Hirakata, Osaka, Japan, assignors to Sanyo Electric Co., Ltd., Moriguchi City, Osaka, Japan
Filed July 31, 1968, Ser. No. 748,993
Claims priority, application Japan, Aug. 1, 1967, 42/49,453
Int. Cl. C04b *35/46, 35/48, 35/50*
U.S. Cl. 252—62.9 3 Claims

ABSTRACT OF THE DISCLOSURE

A piezoelectric ceramic composition which consists essentially of the ternary solid solution $$Pb[(Co_{1/3}, Nb_{2/3})_x, Zr_y, Ti_z]O_3$$

where $x+y+z=1$ and the composition lies within the area A-B-C-D-E-F of the triangular composition diagram of the drawing, wherein an oxide of tantalum or thorium is added with the range of from about 0.2 to about 1.0 weight percent of the composition to improve the electromechanical coupling coefficient and the mechanical quality factor of the composition.

BACKGROUND OF THE INVENTION

This invention relates to improved piezoelectric ceramic compositions, particularly to ceramic compositions consisting essentially of the ternary solid solution $$Pb(Co_{1/3}Nb_{2/3})O_3\text{-}PbZrO_3\text{-}PbTiO_3$$

Among the conventionally widely used piezoelectric ceramic materials are those which respectively have lead zirconate-lead titanate or barium titanate as their principal components. Various improvements have heretofore been made in these materials. For example, it has been proposed that part of Pb of lead zirconate-lead titanate is replaced by a metal ion such as barium, strontium and calcium. Another attempt for improvement was to add various metal oxides to the known piezoelectric ceramic materials. These attempts aimed at enhancement of the piezoelectric properties and improvement of the sinterability of the materials. These improved materials have their respective merits and demerits. For example, the ceramics consisting essentially of lead zirconate-lead titanate are superior to barium titanate type ceramics in the electromechanical coupling coefficient and the stability of the resonant frequency with operating temperature but they are disadvantageous in that since a considerably high sintering temperature (usually 1300° C. or above) is required, the evaporation of lead oxide during the sintering operation makes it difficult to manufacture desired sintered products in addition to the fact that a slight change in composition causes a great change in piezoelectric properties so that uniform products can hardly be obtained. A further disadvantage of the lead zirconate-lead titanate type ceramics is that a high electric field such as 40–50 kv./cm. is required for polarization treatment.

It is, therefore, the fundamental object of the invention to provide new and improved piezoelectric ceramic materials which, over a relatively wide range of composition, have a high electromechanical coupling coefficient and/or a good stability in the resonant frequency with operating temperature and are easy to sinter and to polarize.

SUMMARY OF INVENTION

The piezoelectric ceramic composition according to the invention is of a ternary solid solution consisting essentially of $Pb(Co_{1/3}Nb_{2/3})O_3$, $PbZrO_3$ and $PbTiO_3$. The ternary solid solution may be expressed by the following general formula:

$$Pb(Co_{1/3}Nb_{2/3})_xZr_yTi_zO_3$$

where $x+y+z=1$. The mole percentage of $$Pb(Co_{1/3}Nb_{2/3})O_3$$

is within the range of 2–60, the mole percentage of $PbZrO_3$ is within the range of 0–80 and the mole percentage of $PbTiO_3$ is within the range of 0–60.

Piezoelectric properties of the above mentioned ceramic composition can be improved by adding thereto various impurities. The impurities which are used therefor are selected from the group consisting of oxides, of manganese, tantalum, thorium, zinc and chromium. The amount of any impurity to be added should be up to 3 weight percent of the total quantity of the ceramic composition.

BRIEF DESCRIPTION OF THE DRAWING

The single figure of the drawing represents the triangular compositional diagram of the ternary system utilized in the present invention.

DESCRIPTION OF THE PREFERRED EMBODIMENTS

To obtain piezoelectric ceramic materials according to the invention, starting materials including, PbO, CoO, $Nb_2O_5$, $ZrO_2$ and $TiO_2$ are intimately mixed for 10–15 hours in a ball mill with water so as to have a relatively uniform grain size. After drying, the mixture is pulverized into a finely divided form so as to make it as homogeneous as possible. The finely divided mixture is molded at a pressure of 1 ton/cm.$^2$ into a desirable form. The block thus obtained is calcined at 850–900° C. for two hours, and pulverized again in the ball mill. The pulverized material is then molded at a pressure of 1 ton/cm.$^2$ into compacts in the form of a disk having a diameter of about 8 mm. and a thickness of about 1 mm. meter. The compacts are sintered at a temperature within the range of 1150–1300° C. for about one hour. The sintering temperature depends on the molar ratio of the composition. The sintering products are polished on the opposite surfaces to the thickness of about 0.4 mm. The polished disk is coated on the opposite surfaces with silver paint and fired at 600° C. to form electrodes. The products are then as the last step, subjected to a polarization treatment which may be carried out by immersing the products in silicon oil at 100° C. and applying a D.C. electric field of 15 kv./cm. thereto.

Forty six specimens having different composition ratios were prepared according to the above mentioned manner. Various properties of those specimens have been measured and are listed in Table 1. In Table 1 each of the values of various properties is an average value for the specimens having the same composition. $k_p$ indicates the radial electromechanical coupling coefficient and T.K(f) indicates the temperature change in resonant frequency which is calculated from the following formula:

$$T.K(f)=\frac{fr\ (60°C.)-fr\ (-20°C.)}{80\times fr\ (20°C.)}$$

where fr(60° C.), fr(−20° C.) and fr(20° C.) are resonant frequency at 60° C., −20° C. and 20° C., respectively. The measured temperature range is −20° C. to +60° C.

It will be understood from Table 1 that in any of the specimens listed therein, since the sintering can be carried out at a relatively low temperature such as below 1300° C., there is no fear of evaporation of lead oxide so that a simpler apparatus may be used for the sintering and materials of a higher density which ensures a superior wet-proofness may be obtained. In addition, all of those specimens listed in Table 1 can be polarized by application such a relatively low D.C. field such as 15 kv./cm. This enables to simplify the apparatus for polarization.

The drawing represents the triangular compositional diagram of the ternary solid solution, $$Pb(Co_{1/3}Nb_{2/3})O_3\text{-}PbZrO_3\text{-}PbTiO_3$$

in which the specimen numbers in Table 1 are shown. Compositions defined by the polygonal region ABCDEF have common characteristics as described above and shown in detail in Table 1. The mole percentage each of the three components of each vertices ABCDEF is given as follows:

| | $Pb(Co_{1/3}Nb_{2/3})O_3$ | $PbZrO_3$ | $PbTiO_3$ |
|---|---|---|---|
| A | 2 | 38 | 60 |
| B | 40 | 0 | 60 |
| C | 60 | 0 | 40 |
| D | 60 | 40 | 0 |
| E | 20 | 80 | 0 |
| F | 2 | 80 | 18 |

Any of the compositions within the polygonal region ABCDEF consists of 2–60 mole percent of $$Pb(Co_{1/3}Nb_{2/3})O_3$$

0–80 mole percent of $PbZrO_3$ and 0–60 mole percent of $PbTiO_3$. The positions of B, C and E are identical with the positions of the specimens having Example Nos. 41, 46 and 12, respectively.

Within the polygonal region GHIJK in the drawing, ceramic products exhibit a particularly excellent electromechanical coupling coefficient of approximately 40% or higher. The mole percentage each of the three components of each vertices GHIJK is given as follows:

| | $Pb(Co_{1/3}Nb_{2/3})O_3$ | $PbZrO_3$ | $PbTiO$ |
|---|---|---|---|
| G | 5 | 49.875 | 45.125 |
| H | 20 | 40 | 40 |
| I | 30 | 28 | 42 |
| J | 30 | 35 | 35 |
| K | 20 | 44 | 36 |

The positions of G, H, I, J and K are identical with the positions of the specimens bearing Example Nos. 7, 16, 27, 24 and 15, respectively. The ceramic products having a composition within the polygonal region GHIJK in FIG. 1 are highly valuable as piezoelectric elements for use in pickups, microphones, vibrators, vibration gauges and ignition elements because of their highly responsive piezoelectric effect.

With the polygonal region LBCMNOP in FIG. 1, ceramic products show a small change in resonant frequency less than $90\times10^{-6}/°$ C. within the temperature range of −20° C. to 60° C. The mole percentage each of the three components of each vertices LBCMNOP is given as follows:

| | $Pb(Co_{1/3}Nb_{2/3})O_3$ | $PbZrO_3$ | $PbTiO_3$ |
|---|---|---|---|
| L | 2 | 45 | 53 |
| B | 40 | 0 | 60 |
| C | 60 | 0 | 40 |
| M | 50 | 25 | 25 |
| N | 40 | 24 | 36 |
| O | 30 | 30 | 40 |
| P | 2 | 64 | 34 |

The positions of L, B, C, M, N and O are identical with the positions of the specimens bearing Example Nos. 2, 41, 46, 43, 38 and 26, respectively. The ceramic products having a composition within the polygonal region LBCMNOP in the drawing are highly valuable as piezoelectric ceramic materials such as ceramic filters for radio or TV use.

Piezoelectric and dielectric properties of the ceramic products having a basic composition described in the above may be improved by adding thereto various impurities. Among the impurities which are useful therefor, there may be mentioned $MnO_2$, $Ta_2O_5$, $ThO_2$, ZnO and $Cr_2O_3$. These impurities may be added either solely or jointly but the amount should be up to three weight percent preferably 0.5 to 1.0 percent by weight of the total quantity of the ceramic product. Some examples for addition of various impurities are given hereinbelow.

Table 2 shows the dielectric, piezoelectric and ceramic properties of the present ceramic compositions with or without $MnO_2$ in an amount of up to 3.0 percent by weight. It will be apparently understood that the addition of $MnO_2$ to the basic compositions listed in and sampled from Table 1 reduces their resonant resistance R to a substantial extent and remarkably increases the mechanical quality factor $Q_M$.

The addition of ZnO is also effective to reduce the resonant resistance R and to increase the mechanical quality factor $Q_M$. Table 3 shows the dielectric, piezoelectric and ceramic properties of the ceramic compositions with or without ZnO in an amount of up to 3.0 percent by weight.

The addition of $Ta_2O_5$ is effective to increase the electromechanical coupling coefficient $k_p$, the mechanical quality factor $Q_M$ and the dielectric constant $\epsilon$. Table 4 shows the dielectric, piezoelectric and ceramic properties of the ceramic compositions with or without $Ta_2O_5$ in an amount of up to 3.0 percent by weight.

The addition of $ThO_2$ is also effective to increase the electromechanical coupling coefficient $k_p$, the mechanical quality factor $Q_M$ and the dielectric constant $\epsilon$. Table 5 shows the dielectric, piezoelectric and ceramic properties of the ceramic compositions with or without $ThO_2$ in an amount of up to 3.0 percent by weight.

The addition of $Cr_2O_3$ is effective to increase the electromechanical coupling coefficient $k_p$, the mechanical quality factor $Q_M$ and the dielectric constant $\epsilon$ as well as in case of addition of $Ta_2O_5$ or $ThO_2$. Table 6 shows the dielectric, piezoelectric and ceramic properties of the ceramic compositions with or without $Cr_2O_3$ in an amount of up to 3.0 percent by weight.

It will be understood from the foregoing that the ternary solid solution $$Pb(Co_{1/3}Nb_{2/3})O_3\text{-}PbZrO_3\text{-}PbTiO_3$$

according to the present invention and the solid solution including an appropriate additive form excellent piezoelectric ceramic bodies. While there have been described what at present are believed to be the preferred embodiments of this invention, it will be obvious that various changes and modifications can be made therein without departing from the invention, and it is aimed, therefore, to cover in the appended claims all such changes and modifications as fall within the true spirit and scope of the invention.

TABLE 1

| Example No. | Mole percentage of composition | | | Sintering temp. (° C.) | Density (g./cm.³) | $k_p$ (percent) | T.K.($f_r$) (×10⁻⁶/° C.) |
|---|---|---|---|---|---|---|---|
| | $Pb(Co_{1/3}Nb_{2/3})O_3$ | $PbZrO_3$ | $PbTiO_3$ | | | | |
| 1 | 2 | 53 | 45 | 1,250 | 6.98 | 20.5 | +51 |
| 2 | 2 | 45 | 53 | 1,250 | 7.25 | 13.7 | |
| 3 | 5 | 60 | 35 | 1,260 | 7.12 | 19.4 | −66 |
| 4 | 5 | 54.6 | 40.4 | 1,250 | 7.14 | 36.0 | +123 |
| 5 | 5 | 52.25 | 42.75 | 1,250 | 7.44 | 31.0 | −59 |
| 6 | 5 | 51 | 44 | 1,250 | 7.10 | 36.8 | +23 |
| 7 | 5 | 49.875 | 45,125 | 1,250 | 7.32 | 43.0 | +183 |
| 8 | 10 | 30 | 10 | 1,270 | 6.76 | 13.7 | +16 |
| 9 | 10 | 49.5 | 40.5 | 1,250 | 7.66 | 22.0 | +90 |
| 10 | 10 | 45 | 45 | 1,250 | 7.61 | 25.0 | +127 |
| 11 | 10 | 40.5 | 49.5 | 1,250 | 7.54 | 23.0 | −40 |
| 12 | 20 | 80 | 0 | 1,230 | 7.22 | 14.2 | +7 |
| 13 | 20 | 70 | 10 | 1,250 | 7.27 | 17.2 | |
| 14 | 20 | 48 | 32 | 1,250 | 7.76 | 37.5 | −180 |
| 15 | 20 | 44 | 36 | 1,250 | 7.88 | 43.0 | −150 |
| 16 | 20 | 40 | 40 | 1,250 | 7.89 | 42.6 | −130 |
| 17 | 20 | 36 | 44 | 1,250 | 7.89 | 35.0 | +36 |
| 18 | 20 | 32 | 48 | 1,250 | 7.77 | 25.0 | −36 |
| 19 | 20 | 20 | 60 | 1,260 | 7.81 | 13.4 | −92 |
| 20 | 25 | 38.5 | 36.5 | 1,250 | 7.73 | 45.2 | −150 |
| 21 | 25 | 37.5 | 37.5 | 1,250 | 7.64 | 41.1 | −36 |
| 22 | 30 | 50 | 20 | 1,260 | 7.70 | 22.3 | |
| 23 | 30 | 42 | 28 | 1,250 | 7.86 | 37.0 | −130 |
| 24 | 30 | 35 | 35 | 1,250 | 7.73 | 45.1 | −130 |
| 25 | 30 | 33 | 37 | 1,250 | 7.85 | 42.6 | −134 |
| 26 | 30 | 30 | 40 | 1,250 | 7.94 | 40.0 | +20 |
| 27 | 30 | 28 | 42 | 1,250 | 7.77 | 42.0 | +29 |
| 28 | 30 | 25 | 45 | 1,250 | 7.90 | 29.5 | −48 |
| 29 | 30 | 20 | 50 | 1,250 | 7.80 | 18.5 | −70 |
| 30 | 35 | 40 | 25 | 1,250 | 7.80 | 32.0 | −133 |
| 31 | 35 | 35 | 30 | 1,250 | 7.90 | 37.4 | −117 |
| 32 | 35 | 27 | 38 | 1,250 | 7.93 | 38.6 | +32 |
| 33 | 35 | 25 | 40 | 1,250 | 7.86 | 35.3 | −8 |
| 34 | 40 | 60 | 0 | 1,270 | 7.63 | 10.0 | −80 |
| 35 | 40 | 40 | 20 | 1,260 | 7.70 | 30.0 | −171 |
| 36 | 40 | 30 | 30 | 1,260 | 7.50 | 26.6 | −188 |
| 37 | 40 | 26 | 34 | 1,250 | 7.88 | 38.4 | −255 |
| 38 | 40 | 24 | 36 | 1,250 | 7.70 | 37.5 | −16 |
| 39 | 40 | 22 | 38 | 1,250 | 7.87 | 38.5 | +65 |
| 40 | 40 | 20 | 40 | 1,250 | 7.84 | 33.8 | +2.5 |
| 41 | 40 | 0 | 60 | 1,190 | 7.75 | 9.7 | −81 |
| 42 | 45 | 22 | 33 | 1,250 | 7.73 | 34.7 | −49 |
| 43 | 50 | 25 | 25 | 1,250 | 7.63 | 30.9 | −240 |
| 44 | 50 | 0 | 50 | 1,190 | 7.52 | 12.0 | −98 |
| 45 | 60 | 20 | 20 | 1,250 | 7.56 | 22.2 | −538 |
| 46 | 60 | 0 | 40 | 1,170 | 7.55 | 13.3 | −8 |

TABLE 2

| Example No. | Mole percentage of basic composition | | | Additive $MnO_2$ (weight percent) | Sintering temp. (° C.) | Density (g./cm.³) | Dielectric constant ε | Electro-mechanical coupling coefficient, $k_p$ (percent) | Mechanical quality factor, $Q_M$ | Resonant resistance, R (Ω) |
|---|---|---|---|---|---|---|---|---|---|---|
| | $Pb(Co_{1/3}Nb_{2/3})O_3$ (mole percent) | $PbZrO_3$ (mole percent) | $PbTiO_3$ (mole percent) | | | | | | | |
| 2 | 2 | 45 | 53 | 0 | 1,250 | 7.25 | 355 | 13.7 | 130 | 780 |
| | | | | 0.2 | 1,240 | 7.27 | 387 | 16.0 | 375 | 536 |
| | | | | 0.5 | 1,240 | 7.28 | 427 | 16.7 | 555 | 256 |
| | | | | 1.0 | 1,230 | 6.98 | 443 | 15.1 | 570 | 219 |
| | | | | 3.0 | 1,230 | 6.91 | 421 | 10.2 | 692 | 280 |
| 8 | 10 | 80 | 10 | 0 | 1,270 | 6.76 | 254 | 13.7 | 307 | 750 |
| | | | | 0.2 | 1,260 | 7.52 | 412 | 14.6 | 962 | 118 |
| | | | | 1.0 | 1,250 | 7.25 | 243 | 11.2 | 1,266 | 238 |
| | | | | 3.0 | 1,250 | 7.20 | 211 | 9.8 | 2,096 | 270 |
| 11 | 10 | 40.5 | 49.5 | 0 | 1,250 | 7.54 | 490 | 23.0 | 212 | 150 |
| | | | | 0.2 | 1,240 | 7.55 | 446 | 28.8 | 553 | 63 |
| | | | | 1.0 | 1,240 | 7.32 | 627 | 13.4 | 769 | 97 |
| 14 | 20 | 48 | 32 | 0 | 1,250 | 7.76 | 365 | 37.5 | 356 | 40 |
| | | | | 0.2 | 1,240 | 7.78 | 531 | 39.1 | 1,022 | 13 |
| | | | | 0.5 | 1,240 | 7.78 | 473 | 36.4 | 917 | 10 |
| | | | | 1.0 | 1,230 | 7.70 | 460 | 32.7 | 568 | 19 |
| 16 | 20 | 40 | 40 | 0 | 1,250 | 7.89 | 485 | 42.6 | 162 | 52 |
| | | | | 0.2 | 1,240 | 7.71 | 968 | 45.8 | 276 | 41 |
| | | | | 0.5 | 1,230 | 7.69 | 944 | 44.4 | 400 | 14 |
| | | | | 1.0 | 1,230 | 7.63 | 715 | 42.8 | 329 | 5 |
| | | | | 3.0 | 1,220 | 7.45 | 703 | 42.0 | 273 | 70 |
| 18 | 20 | 32 | 48 | 0 | 1,250 | 7.77 | 601 | 25.0 | 276 | 62 |
| | | | | 0.2 | 1,240 | 7.78 | 927 | 23.9 | 1,031 | 16 |
| | | | | 0.5 | 1,240 | 7.60 | 790 | 21.2 | 1,517 | 18 |
| | | | | 1.0 | 1,230 | 7.33 | 608 | 17.2 | 1,423 | 21 |
| 19 | 20 | 20 | 60 | 0 | 1,260 | 7.81 | 426 | 13.4 | 225 | 380 |
| | | | | 0.2 | 1,250 | 7.71 | 429 | 9.2 | 568 | 201 |
| | | | | 0.5 | 1,250 | 7.40 | 410 | 8.9 | 2,020 | 153 |
| | | | | 1.0 | 1,240 | 7.25 | 382 | 7.1 | 2,281 | 103 |
| | | | | 3.0 | 1,240 | 6.94 | 308 | 6.9 | 2,054 | 98 |
| 22 | 30 | 50 | 20 | 0 | 1,260 | 7.70 | 503 | 22.3 | 385 | 65 |
| | | | | 0.5 | 1,240 | 7.73 | 450 | 25.9 | 1,002 | 11 |
| | | | | 1.0 | 1,240 | 7.51 | 326 | 21.3 | 1,289 | 12 |
| 23 | 30 | 42 | 28 | 0 | 1,250 | 7.86 | 506 | 37.0 | 380 | 32 |
| | | | | 0.5 | 1,240 | 7.89 | 560 | 37.3 | 692 | 18 |
| | | | | 1.0 | 1,240 | 7.85 | 420 | 29.7 | 1,039 | 9 |
| 24 | 30 | 35 | 35 | 0 | 1,240 | 7.73 | 870 | 45.1 | 236 | 18 |
| | | | | 0.2 | 1,230 | 7.81 | 761 | 46.8 | 373 | 12 |
| | | | | 0.5 | 1,230 | 7.77 | 648 | 42.3 | 943 | 6 |
| | | | | 1.0 | 1,220 | 7.54 | 620 | 40.9 | 250 | 30 |
| | | | | 3.0 | 1,220 | 7.28 | 415 | 37.2 | 198 | 97 |

TABLE 2—Continued

| Example No. | Mole percentage of basic composition: $Pb(Co_{1/3}Nb_{2/3})O_3$ (mole percent) | $PbZrO_3$ (mole percent) | $PbTiO_3$ (mole percent) | Additive $MnO_2$ (weight percent) | Sintering temp. (° C.) | Density (g./cm.$^3$) | Dielectric constant $\epsilon$ | Electromechanical coupling coefficient, $k_p$ (percent) | Mechanical quality factor, $Q_M$ | Resonant resistance, R (Ω) |
|---|---|---|---|---|---|---|---|---|---|---|
| 27 | 30 | 28 | 42 | 0 | 1,250 | 7.77 | 961 | 42.0 | 306 | 20 |
| | | | | 0.2 | 1,240 | 7.83 | 1,652 | 43.1 | 1,024 | 4 |
| | | | | 0.5 | 1,230 | 7.74 | 1,558 | 34.8 | 1,863 | 3 |
| | | | | 1.0 | 1,230 | 7.63 | 1,332 | 26.9 | 2,564 | 3 |
| 29 | 30 | 20 | 50 | 0 | 1,250 | 7.80 | 552 | 18.5 | 318 | 97 |
| | | | | 0.2 | 1,230 | 7.82 | 760 | 18.9 | 1,709 | 21 |
| | | | | 1.0 | 1,230 | 7.74 | 620 | 17.8 | 1,352 | 17 |
| 34 | 40 | 60 | 0 | 0 | 1,270 | 7.63 | 417 | 10.0 | 714 | 212 |
| | | | | 0.2 | 1,260 | 7.69 | 582 | 15.8 | 912 | 121 |
| | | | | 1.0 | 1,250 | 7.72 | 710 | 13.9 | 1,652 | 47 |
| | | | | 3.0 | 1,250 | 7.60 | 473 | 13.2 | 1,108 | 56 |
| 36 | 40 | 30 | 30 | 0 | 1,260 | 7.50 | 911 | 26.6 | 244 | 45 |
| | | | | 0.2 | 1,240 | 7.74 | 1,042 | 31.2 | 520 | 22 |
| | | | | 1.0 | 1,240 | 7.61 | 830 | 29.9 | 869 | 12 |
| 40 | 40 | 20 | 40 | 0 | 1,250 | 7.84 | 1,272 | 33.8 | 248 | 18 |
| | | | | 0.2 | 1,240 | 7.83 | 1,348 | 35.5 | 489 | 5 |
| | | | | 1.0 | 1,240 | 7.80 | 1,121 | 30.0 | 1,467 | 4 |
| 41 | 40 | 0 | 60 | 0 | 1,190 | 7.75 | 494 | 9.7 | 233 | 600 |
| | | | | 0.2 | 1,170 | 7.75 | 500 | 10.6 | 361 | 441 |
| | | | | 0.5 | 1,170 | 7.78 | 646 | 11.7 | 1,126 | 243 |
| | | | | 1.0 | 1,160 | 7.76 | 465 | 10.6 | 1,880 | 81 |
| 43 | 50 | 25 | 25 | 0 | 1,250 | 7.63 | 635 | 30.9 | 70 | 182 |
| | | | | 0.5 | 1,230 | 7.77 | 1,289 | 32.2 | 921 | 18 |
| | | | | 1.0 | 1,230 | 7.80 | 1,310 | 29.7 | 939 | 21 |
| 45 | 60 | 20 | 20 | 0 | 1,250 | 7.56 | 1,160 | 22.2 | 130 | 85 |
| | | | | 0.2 | 1,230 | 7.58 | 923 | 29.1 | 989 | 12 |
| | | | | 1.0 | 1,220 | 7.60 | 803 | 21.3 | 1,230 | 6 |
| | | | | 3.0 | 1,220 | 7.51 | 686 | 19.0 | 1,454 | 23 |
| 46 | 60 | 0 | 40 | 0 | 1,170 | 7.55 | 852 | 13.3 | 265 | 172 |
| | | | | 0.2 | 1,160 | 7.85 | 1,786 | 20.1 | 500 | 22 |
| | | | | 0.5 | 1,150 | 7.88 | 1,864 | 23.5 | 1,851 | 5 |
| | | | | 1.0 | 1,150 | 8.00 | 1,923 | 25.1 | 2,364 | 2 |
| | | | | 6.0 | 1,140 | 7.92 | 1,620 | 18.6 | 628 | 18 |

TABLE 3

| Example No. | Mole percentage of basic composition: $Pb(Co_{1/3}Nb_{2/3})O_3$ | $PbZrO_3$ | $PbTiO_3$ | Additive ZnO (weight percent) | Sintering temp. (° C.) | Density (g./cm.$^3$) | Dielectric constant $\epsilon$ | Electromechanical coupling coefficient $k_p$ (percent) | Mechanical quality factor $Q_M$ | Resonant resistant R (Ω) |
|---|---|---|---|---|---|---|---|---|---|---|
| 1 | 2 | 53 | 45 | 0 | 1,250 | 6.98 | 475 | 20.5 | 163 | 200 |
| | | | | 0.2 | 1,240 | 7.63 | 483 | 25.0 | 489 | 48 |
| | | | | 1.0 | 1,230 | 7.62 | 487 | 24.3 | 478 | 52 |
| | | | | 3.0 | 1,230 | 7.54 | 451 | 19.9 | 521 | 60 |
| 8 | 10 | 80 | 10 | 0 | 1,270 | 6.76 | 254 | 13.7 | 307 | 750 |
| | | | | 0.2 | 1,250 | 7.42 | 268 | 15.1 | 2,712 | 50 |
| | | | | 1.0 | 1,240 | 7.38 | 272 | 14.4 | 2,962 | 37 |
| | | | | 3.0 | 1,240 | 7.24 | 264 | 13.5 | 2,631 | 52 |
| | 20 | 44 | 36 | 0 | 1,250 | 7.88 | 426 | 43.0 | 243 | 37 |
| | | | | 0.2 | 1,240 | 7.89 | 489 | 45.2 | 515 | 13 |
| | | | | 1.0 | 1,230 | 7.87 | 471 | 43.1 | 539 | 9 |
| 18 | 20 | 32 | 48 | 0 | 1,250 | 7.77 | 601 | 25.0 | 276 | 62 |
| | | | | 0.2 | 1,240 | 7.78 | 789 | 28.6 | 601 | 21 |
| | | | | 1.0 | 1,230 | 7.79 | 721 | 27.8 | 627 | 18 |
| 19 | 20 | 20 | 60 | 0 | 1,260 | 7.81 | 426 | 13.4 | 225 | 330 |
| | | | | 0.2 | 1,250 | 7.84 | 433 | 14.5 | 923 | 124 |
| | | | | 1.0 | 1,240 | 7.85 | 430 | 14.1 | 2,151 | 81 |
| | | | | 3.0 | 1,230 | 7.71 | 431 | 13.7 | 1,979 | 90 |
| 22 | 30 | 50 | 20 | 0 | 1,260 | 7.70 | 503 | 22.3 | 385 | 65 |
| | | | | 0.2 | 1,250 | 7.80 | 538 | 23.6 | 1,154 | 21 |
| | | | | 1.0 | 1,240 | 7.77 | 601 | 24.1 | 1,493 | 12 |
| 24 | 30 | 35 | 35 | 0 | 1,250 | 7.73 | 870 | 45.1 | 236 | 18 |
| | | | | 0.2 | 1,240 | 7.73 | 922 | 46.7 | 588 | 10 |
| | | | | 1.0 | 1,230 | 7.71 | 901 | 44.8 | 593 | 13 |
| 33 | 35 | 25 | 40 | 0 | 1,250 | 7.86 | 1,210 | 35.3 | 328 | 13 |
| | | | | 0.2 | 1,240 | 7.88 | 1,452 | 38.9 | 498 | 6 |
| | | | | 1.0 | 1,230 | 7.85 | 1,532 | 37.2 | 511 | 8 |
| 34 | 40 | 60 | 0 | 0 | 1,270 | 7.63 | 417 | 10.0 | 714 | 212 |
| | | | | 0.2 | 1,260 | 7.66 | 760 | 14.1 | 2,054 | 45 |
| | | | | 1.0 | 1,250 | 7.68 | 903 | 13.0 | 1,823 | 37 |
| | | | | 3.0 | 1,240 | 7.61 | 870 | 12.7 | 1,205 | 61 |
| 45 | 60 | 20 | 20 | 0 | 1,250 | 7.56 | 1,160 | 22.2 | 130 | 85 |
| | | | | 0.2 | 1,230 | 7.58 | 1,542 | 24.6 | 1,457 | 9 |
| | | | | 1.0 | 1,230 | 7.60 | 1,620 | 25.1 | 1,604 | 8 |
| | | | | 3.0 | 1,220 | 7.54 | 1,013 | 23.0 | 1,324 | 19 |
| 46 | 60 | 0 | 40 | 0 | 1,170 | 7.55 | 852 | 13.3 | 265 | 172 |
| | | | | 0.2 | 1,160 | 7.60 | 1,620 | 16.1 | 722 | 33 |
| | | | | 1.0 | 1,150 | 7.58 | 1,714 | 17.8 | 2,628 | 8 |
| | | | | 3.0 | 1,140 | 7.55 | 1,452 | 17.1 | 1,156 | 16 |

TABLE 4

| Example No. | Mole percentage of basic composition: $Pb(Co_{1/3}Nb_{2/3})O_3$ | $PbZrO_3$ | $PbTO_3$ | Additive $Ta_2O_5$ (weight percent) | Sintering temp. (° C.) | Density (g./cm.$^3$) | Dielectric constant $\epsilon$ | Electro-mechanical coupling coefficient $k_p$ (percent) | Mechanical quality factor $Q_M$ | Resonant resistant (Ω) |
|---|---|---|---|---|---|---|---|---|---|---|
| 1 | 2 | 53 | 45 | 0 | 1,250 | 6.98 | 475 | 20.5 | 163 | 200 |
| | | | | 0.2 | 1,240 | 7.21 | 603 | 26.2 | 325 | 68 |
| | | | | 1.0 | 1,230 | 7.18 | 621 | 23.8 | 301 | 73 |
| | | | | 3.0 | 1,230 | 7.11 | 615 | 21.2 | 296 | 92 |
| 8 | 10 | 80 | 10 | 0 | 1,270 | 6.76 | 254 | 13.7 | 307 | 750 |
| | | | | 0.2 | 1,250 | 7.43 | 282 | 18.6 | 354 | 112 |
| | | | | 1.0 | 1,240 | 7.42 | 328 | 17.2 | 348 | 53 |
| | | | | 3.0 | 1,240 | 7.40 | 271 | 14.1 | 326 | 68 |
| 15 | 20 | 44 | 36 | 0 | 1,250 | 7.88 | 426 | 43.0 | 243 | 37 |
| | | | | 0.2 | 1,240 | 7.88 | 1,224 | 53.1 | 251 | 30 |
| | | | | 1.0 | 1,230 | 7.86 | 1,091 | 52.3 | 275 | 25 |
| 18 | 20 | 32 | 48 | 0 | 1,250 | 7.77 | 601 | 25.0 | 276 | 62 |
| | | | | 0.2 | 1,240 | 7.79 | 1,054 | 31.2 | 450 | 40 |
| | | | | 1.0 | 1,230 | 7.80 | 978 | 28.0 | 423 | 51 |
| 19 | 20 | 20 | 60 | 0 | 1,260 | 7.81 | 426 | 13.4 | 225 | 380 |
| | | | | 0.2 | 1,250 | 7.79 | 458 | 17.1 | 540 | 180 |
| | | | | 1.0 | 1,240 | 7.76 | 602 | 18.1 | 1,020 | 33 |
| | | | | 3.0 | 1,230 | 7.71 | 521 | 17.6 | 996 | 41 |
| 22 | 30 | 50 | 20 | 0 | 1,260 | 7.70 | 503 | 22.3 | 385 | 65 |
| | | | | 0.2 | 1,250 | 7.71 | 711 | 24.8 | 528 | 18 |
| | | | | 1.0 | 1,240 | 7.68 | 630 | 23.2 | 511 | 17 |
| 24 | 30 | 35 | 35 | 0 | 1,250 | 7.73 | 870 | 45.1 | 235 | 18 |
| | | | | 0.2 | 1,240 | 7.76 | 1,721 | 56.0 | 278 | 15 |
| | | | | 1.0 | 1,230 | 7.74 | 1,515 | 53.8 | 265 | 14 |
| 33 | 35 | 25 | 40 | 0 | 1,250 | 7.86 | 1,210 | 35.3 | 328 | 13 |
| | | | | 0.2 | 1,240 | 7.84 | 2,326 | 42.5 | 331 | 8 |
| | | | | 1.0 | 1,230 | 7.83 | 2,092 | 40.2 | 326 | 9 |
| 34 | 40 | 60 | 0 | 0 | 1,270 | 7.63 | 417 | 10.0 | 714 | 212 |
| | | | | 0.2 | 1,260 | 7.63 | 689 | 17.3 | 986 | 91 |
| | | | | 1.0 | 1,250 | 7.65 | 721 | 15.1 | 1,023 | 54 |
| | | | | 3.0 | 1,240 | 7.41 | 890 | 14.3 | 825 | 28 |
| 45 | 60 | 20 | 20 | 0 | 1,250 | 7.56 | 1,160 | 22.2 | 130 | 85 |
| | | | | 0.2 | 1,230 | 7.56 | 2,021 | 33.1 | 628 | 40 |
| | | | | 1.0 | 1,230 | 7.57 | 1,965 | 30.0 | 820 | 21 |
| | | | | 3.0 | 1,220 | 7.51 | 1,621 | 26.4 | 659 | 33 |
| 46 | 60 | 0 | 40 | 0 | 1,170 | 7.55 | 852 | 13.3 | 265 | 172 |
| | | | | 0.2 | 1,160 | 7.61 | 1,520 | 22.1 | 438 | 40 |
| | | | | 1.0 | 1,150 | 7.60 | 1,411 | 25.3 | 1,906 | 10 |
| | | | | 3.0 | 1,140 | 7.58 | 1,303 | 19.5 | 988 | 16 |

TABLE 5

| Example No. | Mole percentage of basic composition: $Pb(Co_{1/3}Nr_{2/3})O_3$ | $PbZrO_3$ | $PvTiO_3$ | Additive $ThO_2$ | Sintering temp. (° C.) | Density (g./cm.$^3$) | Dielectric constant $\epsilon$ | Electro-mechanical coupling coefficient $k_p$ (percent) | Mechanical quality $Q_M$ | Resonant resistant R (Ω) |
|---|---|---|---|---|---|---|---|---|---|---|
| 1 | 2 | 53 | 45 | 0 | 1,250 | 6.98 | 475 | 20.5 | 163 | 200 |
| | | | | 0.2 | 1,240 | 7.68 | 591 | 26.7 | 450 | 52 |
| | | | | 1.0 | 1,230 | 7.70 | 628 | 27.2 | 447 | 60 |
| | | | | 3.0 | 1,230 | 7.48 | 601 | 22.1 | 394 | 78 |
| 8 | 10 | 80 | 10 | 0 | 1,270 | 6.76 | 254 | 13.7 | 307 | 750 |
| | | | | 0.2 | 1,260 | 7.48 | 288 | 17.6 | 2,680 | 56 |
| | | | | 1.0 | 1,250 | 7.52 | 367 | 14.3 | 2,812 | 42 |
| | | | | 3.0 | 1,240 | 7.42 | 310 | 11.1 | 2,507 | 68 |
| 15 | 20 | 44 | 36 | 0 | 1,250 | 7.88 | 426 | 43.0 | 243 | 37 |
| | | | | 0.2 | 1,240 | 7.90 | 870 | 48.4 | 291 | 15 |
| | | | | 0.5 | 1,230 | 7.90 | 955 | 51.3 | 253 | 22 |
| | | | | 1.0 | 1,220 | 7.80 | 620 | 49.1 | 245 | 29 |
| 18 | 20 | 32 | 48 | 0 | 1,250 | 7.77 | 601 | 25.0 | 276 | 62 |
| | | | | 0.2 | 1,240 | 7.83 | 993 | 31.2 | 495 | 21 |
| | | | | 0.5 | 1,230 | 7.86 | 982 | 32.5 | 427 | 33 |
| | | | | 1.0 | 1,220 | 7.80 | 928 | 27.3 | 389 | 42 |
| 19 | 20 | 20 | 60 | 0 | 1,260 | 7.81 | 426 | 13.4 | 225 | 380 |
| | | | | 0.2 | 1,250 | 7.83 | 495 | 15.9 | 889 | 151 |
| | | | | 1.0 | 1,240 | 7.88 | 583 | 14.8 | 2,061 | 98 |
| | | | | 3.0 | 1,230 | 7.80 | 451 | 14.1 | 1,920 | 95 |
| 22 | 30 | 50 | 20 | 0 | 1,260 | 7.70 | 503 | 22.3 | 385 | 65 |
| | | | | 0.2 | 1,250 | 7.74 | 659 | 29.6 | 1,035 | 21 |
| | | | | 0.5 | 1,240 | 7.79 | 728 | 30.7 | 1,540 | 10 |
| | | | | 1.0 | 1,230 | 7.71 | 624 | 27.1 | 1,621 | 13 |
| 24 | 30 | 35 | 35 | 0 | 1,250 | 7.73 | 870 | 45.1 | 236 | 18 |
| | | | | 0.2 | 1,240 | 7.76 | 1,062 | 53.0 | 368 | 8 |
| | | | | 1.0 | 1,230 | 7.75 | 1,281 | 51.4 | 342 | 12 |
| 33 | 35 | 25 | 40 | 0 | 1,250 | 7.86 | 1,210 | 35.3 | 328 | 13 |
| | | | | 0.2 | 1,240 | 7.90 | 1,869 | 42.6 | 379 | 8 |
| | | | | 0.5 | 1,240 | 7.88 | 1,905 | 40.2 | 389 | 10 |
| | | | | 1.0 | 1,230 | 7.86 | 1,267 | 36.8 | 342 | 15 |

TABLE 5—Continued

| Example No. | Mole percentage of basic composition: $Pb(Co_{1/3}Nr_{2/3})O_3$ | $PbZrO_3$ | $PvTiO_3$ | Additive $ThO_2$ | Sintering temp. (° C.) | Density (g/.cm.$_3$) | Dielectric constant $\epsilon$ | Electro-mechanical coupling coefficient $k_p$ (percent) | Mechanical quality $Q_M$ | Resonant resistant R (Ω) |
|---|---|---|---|---|---|---|---|---|---|---|
| 34 | 40 | 60 | 0 | 0 | 1,270 | 7.63 | 417 | 10.0 | 714 | 212 |
| | | | | 0.2 | 1,260 | 7.68 | 562 | 16.1 | 1,908 | 56 |
| | | | | 1.0 | 1,250 | 7.71 | 810 | 14.6 | 1,652 | 40 |
| | | | | 3.0 | 1,230 | 7.67 | 926 | 13.9 | 1,544 | 59 |
| 45 | 60 | 20 | 20 | 0 | 1,250 | 7.56 | 1,160 | 22.2 | 130 | 85 |
| | | | | 0.2 | 1,230 | 7.61 | 1,692 | 32.3 | 1,310 | 10 |
| | | | | 1.0 | 1,230 | 7.67 | 1,825 | 27.4 | 1,560 | 5 |
| | | | | 3.0 | 1,220 | 7.60 | 1,187 | 25.3 | 1,120 | 18 |
| 46 | 60 | 0 | 40 | 0 | 1,170 | 7.55 | 852 | 13.3 | 265 | 172 |
| | | | | 0.2 | 1,160 | 7.58 | 1,801 | 21.8 | 691 | 32 |
| | | | | 1.0 | 1,150 | 7.62 | 1,966 | 26.2 | 2,465 | 6 |
| | | | | 3.0 | 1,140 | 7.57 | 1,712 | 19.8 | 1,058 | 12 |

TABLE 6

| Example No. | Mole percentage of basic composition: $Pb(Co_{1/3}Nb_{2/3})O$ | $PbZrO_3$ | $PbTiO_3$ | Additive $Cr_2O_3$ (weight percent) | Sintering temp (° C.) | Density (g./cm.$^3$) | Dielectric constant $\epsilon$ | Electro-mechanical coupling coefficient $k_p$ (percent) | Mechanical quality factor $Q_M$ | Resonant resistant R (Ω) |
|---|---|---|---|---|---|---|---|---|---|---|
| 1 | 2 | 53 | 45 | 0 | 1,250 | 6.98 | 475 | 20.5 | 163 | 200 |
| | | | | 0.2 | 1,240 | 7.21 | 481 | 21.7 | 423 | 102 |
| | | | | 1.0 | 1,230 | 7.28 | 492 | 21.8 | 455 | 89 |
| | | | | 3.0 | 1,230 | 7.14 | 387 | 20.6 | 320 | 121 |
| 8 | 10 | 80 | 10 | 0 | 1,270 | 6.76 | 254 | 13.7 | 307 | 750 |
| | | | | 0.2 | 1,250 | 7.41 | 445 | 15.1 | 889 | 220 |
| | | | | 1.0 | 1,240 | 7.38 | 451 | 16.3 | 1,003 | 154 |
| | | | | 3.0 | 1,240 | 7.26 | 328 | 14.2 | 1,154 | 172 |
| 15 | 20 | 44 | 36 | 0 | 1,250 | 7.88 | 426 | 43.0 | 243 | 37 |
| | | | | 0.2 | 1,240 | 7.88 | 581 | 45.3 | 617 | 22 |
| | | | | 1.0 | 1,230 | 7.82 | 560 | 44.7 | 679 | 26 |
| 18 | 20 | 32 | 48 | 0 | 1,250 | 7.77 | 601 | 25.0 | 276 | 62 |
| | | | | 0.2 | 1,240 | 7.76 | 825 | 27.3 | 1,168 | 28 |
| | | | | 1.0 | 1,230 | 7.71 | 718 | 24.7 | 1,094 | 34 |
| 19 | 20 | 20 | 60 | 0 | 1,260 | 7.81 | 426 | 13.4 | 225 | 380 |
| | | | | 0.2 | 1,250 | 7.82 | 476 | 14.1 | 483 | 226 |
| | | | | 1.0 | 1,240 | 7.79 | 454 | 12.8 | 1,381 | 151 |
| | | | | 3.0 | 1,230 | 7.49 | 328 | 11.5 | 11,015 | 101 |
| 22 | 30 | 50 | 20 | 0 | 1,260 | 7.70 | 503 | 22.3 | 385 | 65 |
| | | | | 0.2 | 1,250 | 7.68 | 476 | 24.1 | 941 | 30 |
| | | | | 1.0 | 1,240 | 7.64 | 389 | 25.2 | 1,002 | 21 |
| 24 | 30 | 35 | 35 | 0 | 1,250 | 7.73 | 870 | 45.1 | 236 | 18 |
| | | | | 0.2 | 1,240 | 7.72 | 928 | 49.0 | 351 | 15 |
| | | | | 1.0 | 1,230 | 7.74 | 810 | 47.8 | 403 | 15 |
| 33 | 35 | 25 | 40 | 0 | 1,250 | 7.86 | 1,210 | 35.3 | 328 | 13 |
| | | | | 0.2 | 1,240 | 7.88 | 1,482 | 37.1 | 481 | 9 |
| | | | | 1.0 | 1,230 | 7.86 | 1,223 | 34.2 | 511 | 10 |
| 34 | 40 | 60 | 0 | 0 | 1,270 | 7.63 | 417 | 10.0 | 714 | 212 |
| | | | | 0.2 | 1,260 | 7.71 | 478 | 14.1 | 771 | 153 |
| | | | | 1.0 | 1,250 | 7.74 | 568 | 12.8 | 868 | 98 |
| | | | | 3.0 | 1,240 | 7.68 | 624 | 9.7 | 794 | 106 |
| 45 | 60 | 20 | 20 | 0 | 1,250 | 7.56 | 1,160 | 22.2 | 130 | 85 |
| | | | | 0.2 | 1,230 | 7.68 | 1,220 | 29.9 | 245 | 32 |
| | | | | 1.0 | 1,230 | 7.72 | 1,060 | 27.6 | 278 | 13 |
| | | | | 3.0 | 1,220 | 7.54 | 883 | 20.0 | 356 | 44 |
| 46 | 60 | 0 | 40 | 0 | 1,170 | 7.55 | 852 | 13.3 | 265 | 172 |
| | | | | 0.2 | 1,160 | 7.71 | 1,690 | 24.1 | 464 | 45 |
| | | | | 1.0 | 1,150 | 7.78 | 1,282 | 23.5 | 1,250 | 11 |
| | | | | 3.0 | 1,140 | 7.62 | 728 | 20.1 | 988 | 22 |

What is claimed is:

1. A piezoelectric ceramic material consisting essentially of a composition of the ternary solid solution expressed by the general formula $Pb[Co_{1/3}, Nb_{2/3})_x, Zr_y, Ti_z]O_3$, where $x+y+z=1$, within the area A-B-C-D-E-F in the triangular composition diagram of the drawing, and further containing an additive selected from the group consisting of oxides of tantalum and thorium in an amount sufficient to increase both the electromechanical coupling coefficient and mechanical quality factor of said composition, said amount being within the range from about 0.2 to about 1.0 weight percent.

2. A piezoelectric ceramic material as in claim 1 wherein the composition lies within the area G-H-I-J-K in the triangular composition diagram of the drawing.

3. A piezoelectric ceramic material as in claim 1 wherein the composition is within the area L-B-C-M-N-O-P in the triangular composition diagram of the drawing.

References Cited

UNITED STATES PATENTS 3,268,453 8/1966 Ouchi et al. ________ 252—62.9
3,518,199 6/1970 Tsubouchi et al. ____ 252—62.9
3,544,469 12/1970 Watanabe et al. _____ 252—62.9

TOBIAS E. LEVOW, Primary Examiner
J. COOPER, Assistant Examiner

U.S. Cl. X.R.

106—39 R